US012684632B2

(12) United States Patent　　　(10) Patent No.:　US 12,684,632 B2
Dreiling et al.　　　　　　　　(45) Date of Patent:　　　Jul. 14, 2026

(54) PROVIDING TELECOMMUNICATIONS RESOURCES TO USERS BASED ON AVAILABILITY

(71) Applicant: T-Mobile USA, Inc., Bellevue, WA (US)

(72) Inventors: Ryan P. Dreiling, Shawnee, KS (US); Mehul Shah, Bellevue, WA (US); Helen Wang, Bellevue, WA (US); Thomas P. Lucht, Seattle, WA (US); Michele Lundahl, Bellevue, WA (US); Derrick L. Ives, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 357 days.

(21) Appl. No.: 18/423,176

(22) Filed: Jan. 25, 2024

(65) Prior Publication Data

US 2025/0247898 A1　　Jul. 31, 2025

(51) Int. Cl.
　　H04W 76/10　　　　(2018.01)
　　H04W 48/16　　　　(2009.01)
　　H04W 48/18　　　　(2009.01)
　　H04W 84/06　　　　(2009.01)

(52) U.S. Cl.
　　CPC ........... H04W 76/10 (2018.02); H04W 48/16 (2013.01); H04W 48/18 (2013.01); H04W 84/06 (2013.01)

(58) Field of Classification Search
　　CPC ..... H04W 48/16; H04W 48/18; H04W 88/06; H04W 84/042; H04W 84/06; H04W 76/10; H04W 76/15; H04W 76/16
　　See application file for complete search history.

(56) References Cited

U.S. PATENT DOCUMENTS

| | | | |
|---|---|---|---|
| 6,411,806 B1 | 6/2002 | Garner et al. | |
| 6,539,217 B1 | 3/2003 | Syed et al. | |
| 7,020,460 B1 | 3/2006 | Sherman et al. | |
| 7,051,080 B1 | 5/2006 | Paul et al. | |

(Continued)

FOREIGN PATENT DOCUMENTS

| | | |
|---|---|---|
| CN | 101467422 A | 6/2009 |
| CN | 105657735 B | 8/2019 |

(Continued)

*Primary Examiner* — Peter Chen
(74) *Attorney, Agent, or Firm* — Perkins Coie LLP

(57)　　　　　　ABSTRACT

Systems and methods for providing telecommunications resources to users based on telecommunications resource availability are disclosed. The system stores information pertaining to one or more mobile networks within a first mobile network list, where a mobile device is prevented from providing an access request to a mobile network in the first mobile network list. In response to determining, via a second mobile network list, that no approved mobile network is available to provide a particular connectivity service, the system determines for each mobile network of the first mobile network list a set of connectivity services associated with each respective mobile network of the mobile network list. The system selects a first mobile network of the one or more mobile networks to provide a first access request to the first mobile network based on a corresponding set of connectivity services including the particular connectivity service associated with the first mobile network.

18 Claims, 4 Drawing Sheets

300

(56)  References Cited

U.S. PATENT DOCUMENTS

| | | | |
|---|---|---|---|
| 7,209,734 | B2 | 4/2007 | Maes |
| 7,292,592 | B2 | 11/2007 | Rune |
| 7,302,229 | B2 | 11/2007 | Riddles |
| 7,305,252 | B2 | 12/2007 | Britt et al. |
| 7,471,654 | B2 | 12/2008 | Mueckenheim et al. |
| 7,529,230 | B2 | 5/2009 | Lewis et al. |
| 7,720,960 | B2 | 5/2010 | Pruss et al. |
| 7,907,945 | B2 | 3/2011 | Deprun |
| 8,032,150 | B2 | 10/2011 | Cole |
| 8,135,406 | B2 | 3/2012 | Wijayanathan et al. |
| 8,254,885 | B1 | 8/2012 | Xue et al. |
| 8,300,598 | B2 | 10/2012 | Kim et al. |
| 8,385,200 | B2 | 2/2013 | Rainer et al. |
| 8,402,165 | B2 | 3/2013 | Deu-ngoc et al. |
| 8,423,002 | B2 | 4/2013 | Hjelm |
| 8,620,319 | B1 | 12/2013 | Thandu et al. |
| 8,737,913 | B2 | 5/2014 | Xiao et al. |
| 8,804,527 | B2 | 8/2014 | Pollari |
| 8,825,002 | B2 | 9/2014 | Meyer et al. |
| 8,934,867 | B2 | 1/2015 | Shanmugavadivel et al. |
| 9,154,953 | B2 | 10/2015 | Tofighbakhsh |
| 9,210,613 | B2 | 12/2015 | Tipton et al. |
| 9,307,517 | B2 | 4/2016 | Alavudin |
| 9,386,414 | B1 | 7/2016 | Mayor et al. |
| 9,426,642 | B1 | 8/2016 | Sridhar et al. |
| 9,451,444 | B2 | 9/2016 | Dawson-haney et al. |
| 9,479,915 | B2 | 10/2016 | Gupta |
| 9,571,868 | B2 | 2/2017 | Shaw et al. |
| 9,572,000 | B2 | 2/2017 | Gupta |
| 9,591,560 | B2 | 3/2017 | Kotecha |
| 9,596,647 | B2 | 3/2017 | Bostick et al. |
| 9,674,691 | B2 | 6/2017 | Lhamon et al. |
| 9,826,401 | B2 | 11/2017 | Carames et al. |
| 9,843,457 | B2 | 12/2017 | Chen et al. |
| 9,882,950 | B2 | 1/2018 | Rubin et al. |
| 9,894,509 | B2 | 2/2018 | Nacer et al. |
| 9,949,172 | B2 | 4/2018 | Sridhar et al. |
| 10,212,639 | B2 | 2/2019 | Kodaypak |
| 10,440,563 | B2 | 10/2019 | Avula et al. |
| 10,588,034 | B1 | 3/2020 | Dowlatkhah et al. |
| 10,740,699 | B2 | 8/2020 | Flotat et al. |
| 10,893,554 | B1 | 1/2021 | Gandhi et al. |
| 10,911,453 | B2 | 2/2021 | Pularikkal et al. |
| 10,959,277 | B2 | 3/2021 | Nguyen et al. |
| 10,992,661 | B2 | 4/2021 | Kirschbaum et al. |
| 11,258,665 | B2 | 2/2022 | Brown et al. |
| 11,382,036 | B2 | 7/2022 | Korneluk et al. |
| 11,509,642 | B2 | 11/2022 | Colon et al. |
| 11,576,016 | B2 | 2/2023 | Prenger et al. |
| 11,956,749 | B2 * | 4/2024 | Kumar .................. H04W 48/04 |
| 2001/0004595 | A1 * | 6/2001 | Dent ..................... H04W 68/08 |
| | | | 455/435.2 |
| 2004/0192339 | A1 | 9/2004 | Wilson et al. |
| 2008/0119203 | A1 | 5/2008 | Shalmon et al. |
| 2009/0129301 | A1 | 5/2009 | Belimpasakis |
| 2009/0300726 | A1 | 12/2009 | Qian et al. |
| 2010/0153001 | A1 | 6/2010 | Bauchot et al. |
| 2015/0079966 | A1 | 3/2015 | Govindarajeswaran et al. |
| 2017/0309552 | A1 | 10/2017 | Singleton et al. |
| 2017/0347388 | A1 | 11/2017 | Cai et al. |
| 2021/0058748 | A1 | 2/2021 | Liao |
| 2021/0297940 | A1 | 9/2021 | Prakasam et al. |
| 2022/0225266 | A1 | 7/2022 | Kumar et al. |
| 2022/0330117 | A1 | 10/2022 | Li et al. |
| 2023/0189371 | A1 | 6/2023 | Ahmad et al. |
| 2023/0261735 | A1 | 8/2023 | O'sullivan et al. |
| 2023/0284006 | A1 | 9/2023 | Menon |
| 2023/0300719 | A1 | 9/2023 | Divvi et al. |
| 2023/0353977 | A1 | 11/2023 | Griesmer et al. |
| 2024/0236833 | A1 * | 7/2024 | Roy ..................... H04W 84/06 |

FOREIGN PATENT DOCUMENTS

| | | | |
|---|---|---|---|
| CN | 113115382 | A | 7/2021 |
| CN | 108989987 | B | 9/2021 |
| CN | 108029153 | B | 10/2021 |
| CN | 111247821 | B | 5/2023 |
| DE | 102004032715 | B4 | 4/2009 |
| EP | 1442622 | B1 | 12/2016 |
| EP | 3763139 | A1 | 1/2021 |
| JP | 3802006 | B2 | 5/2006 |
| JP | 6678275 | B2 | 3/2020 |
| KR | 100660424 | B1 | 12/2006 |
| KR | 100760506 | B1 | 9/2007 |
| KR | 100922974 | B1 | 10/2009 |
| KR | 100954283 | B1 | 4/2010 |
| KR | 100955810 | B1 | 5/2010 |
| WO | 2005079038 | A1 | 8/2005 |
| WO | 2006058553 | A1 | 6/2006 |
| WO | 2009155120 | A2 | 12/2009 |
| WO | 2015020370 | A1 | 2/2015 |
| WO | 2018010160 | A1 | 1/2018 |
| WO | 2019157433 | A1 | 8/2019 |
| WO | 2020159516 | A1 | 8/2020 |

* cited by examiner

300

Start

302

Store information pertaining to one or more mobile networks within a first mobile network list

304

Determine that no approved mobile network is available to provide a particular connectivity service

306

Determine a set of connectivity services

308

Select a first mobile network

End

PROVIDING TELECOMMUNICATIONS RESOURCES TO USERS BASED ON AVAILABILITY

BACKGROUND

Current wireless communications systems (e.g., fifth-generation (5G) mobile networks) utilize base stations to communicate with a user equipment (UE). Base stations can be located at the surface of the Earth and support telecommunications coverage in a surrounding area. When in a coverage region of the base station, the UE can connect with the base station to communicate data through the network. Currently, the sixth-generation (6G) mobile system standard is under development. 6G enables the UE to communicate directly with an orbiting satellite. The UE can connect to the satellite when within a coverage region of the satellite. In general, a satellite can provide a larger coverage region and can more easily provide coverage to remote locations. Accordingly, network providers are utilizing non-terrestrial networks (NTNs) to increase coverage and provide improved networks.

BRIEF DESCRIPTION OF THE DRAWINGS

Detailed descriptions of implementations of the present invention will be described and explained through the use of the accompanying drawings.

Figure 1:
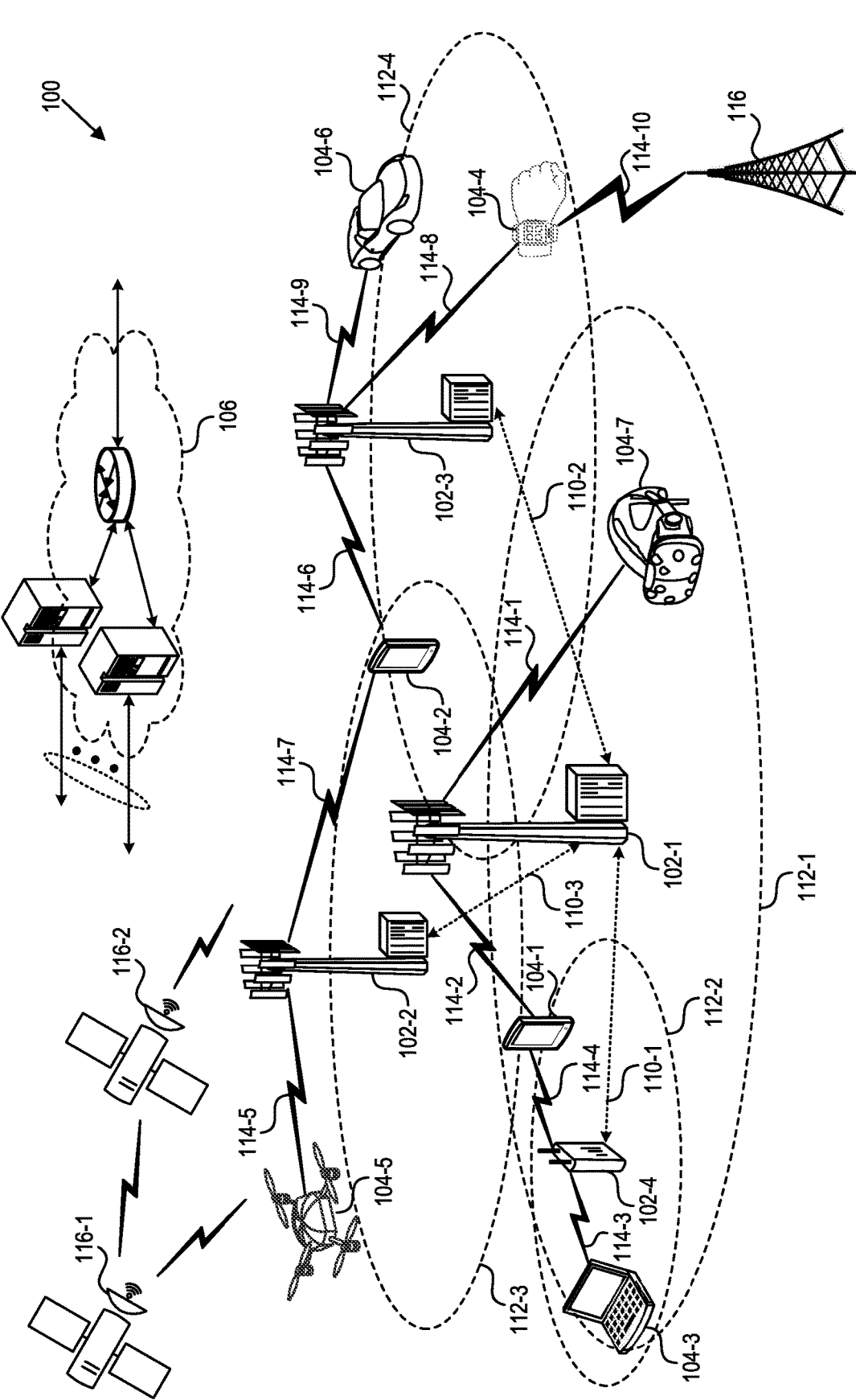
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless communication utilize satellites to improve network coverage. Given that satellites are not bound to the surface of the Earth, satellites can provide a larger coverage region than base stations and more easily provide coverage in remote locations. As a consequence of this increased coverage region, a greater number of users may compete for communication resources provided by the satellite networks, thereby increasing congestion. This congestion can be worsened by the limited wireless resources that are provided by these networks. For example, satellite networks can be difficult or costly to implement, resulting in these networks having decreased bandwidths or greater latency. Thus, satellite networks can be resource-constrained due to increased competition for limited communication resources.

Given that satellite networks can be more resource-constrained than terrestrial networks implemented through surface-bound base stations, mobile network operators can choose to limit network traffic on satellite networks to ensure that sufficient wireless resources are available to service users in coverage regions that are only covered by the satellite networks. For example, satellite networks can expand the coverage region of mobile networks into remote areas in which it can be too challenging or cost prohibitive to install base stations. Thus, users located in these regions can only receive wireless communication services through the satellite networks. To prioritize satellite network resources for these users, when both a terrestrial network and a satellite network are available to provide a wireless communication service, a mobile network operator can choose to prevent requests for the wireless communication service to be provided through the satellite network.

However, in scenarios where no terrestrial network is available when satellite networks are available, or when a terrestrial network that is available fails to provide a particular wireless communication service needed by a user, satellite networks may become favorable to connect to. As described above, while prioritizing satellite network resources for users located in geographically challenged areas may beneficial to such users, other users may not have access to a particular wireless communication service that they are in need of. For example, when a terrestrial network is available to provide voice services (e.g., a phone call), a given user may not need voice services but rather text services (e.g., SMS) that may be offered by a satellite network. However, given that existing systems may prevent users from connecting to a satellite network when one or more terrestrial networks are available, users may be prevented from accessing services that they are in need of. Therefore, what is needed is a process to strike a balance between reducing satellite network congestion while still providing wireless communication services that users are in need of at a given time.

The present technology relates to techniques, apparatuses, and systems for providing telecommunications resources to users based on telecommunications resource availability. For example, a system can reduce satellite network congestion by providing access to satellite networks based on (i) a lack of approved terrestrial networks' ability to provide a particular wireless communication service and (ii) a respective satellite network providing the particular wireless communication service.

The system can store information indicative of one or more satellite networks within a mobile network graylist. For example, the network graylist may be a list stored on a mobile device that includes Public Land Mobile Network (PLMN) codes of wireless networks to which the mobile device is prevented from providing a wireless access request. As opposed to blacklists that are unchangeable and forbid access to any networks listed within the blacklist, the graylist may be updatable such that wireless networks may be added or removed from the list when certain criteria are met. In this way, the system may provide a dynamic list of networks that may be accessible, as opposed to permanently forbidding access, thereby providing wireless access connectivity based on telecommunications resource availability. The system can then determine, via a mobile network whitelist, that no approved terrestrial network is available to provide a particular wireless communication service. For example, as opposed to the blacklist, a whitelist may store PLMN codes of wireless networks to which the mobile device is approved to provide wireless access requests (e.g., to establish a wireless connection).

When the system determines that no approved terrestrial network is available to provide a particular wireless communication service (e.g., a wireless communication service that the user is in need of), the system can determine a set of connectivity services associated with each respective satellite network of the one or more satellite networks in the mobile network graylist. For instance, the system can determine which satellite networks offer the particular wireless communication service that the user is in need of as well as other wireless communication services that a given satellite network can provide. The system can then select a first satellite network of the one or more satellite networks to generate a first wireless access request to the first satellite network based on a corresponding set of connectivity services (e.g., including the particular wireless communication service). For instance, to reduce satellite network congestion, the system first ensures that a given satellite network offers the particular wireless communication service prior to generating or transmitting a first wireless access request to the satellite network to establish a connection with the satellite network. In this way, the system reduces satellite network congestion by limiting access to satellite networks to instances where (i) a terrestrial network cannot provide a particular wireless communication service and (ii) a given satellite network can provide the particular wireless communication service.

In various implementations, the methods and systems described herein can provide telecommunications resources to users based on telecommunications resource availability. For example, the system can store information pertaining to one or more mobile networks within a first mobile network list, where a mobile device is prevented from providing an access request to a mobile network indicated on the first mobile network list. The system can then determine, via a second mobile network list, that no approved mobile network is available to provide a particular connectivity service. In response to the determination that no approved network is available to provide the particular connectivity service, the system determines, for each mobile network of the one or more mobile networks of the first mobile network list, a set of connectivity services associated with each respective mobile network of the one or more mobile networks. The system can then select a first mobile network of the one or more mobile networks to provide a first access request to the first mobile network based on a corresponding set of connectivity services including the particular connectivity service associated with the first mobile network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4

(also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 (Gigahertz) GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid Automatic Repeat Request (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of the network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, an NTN is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
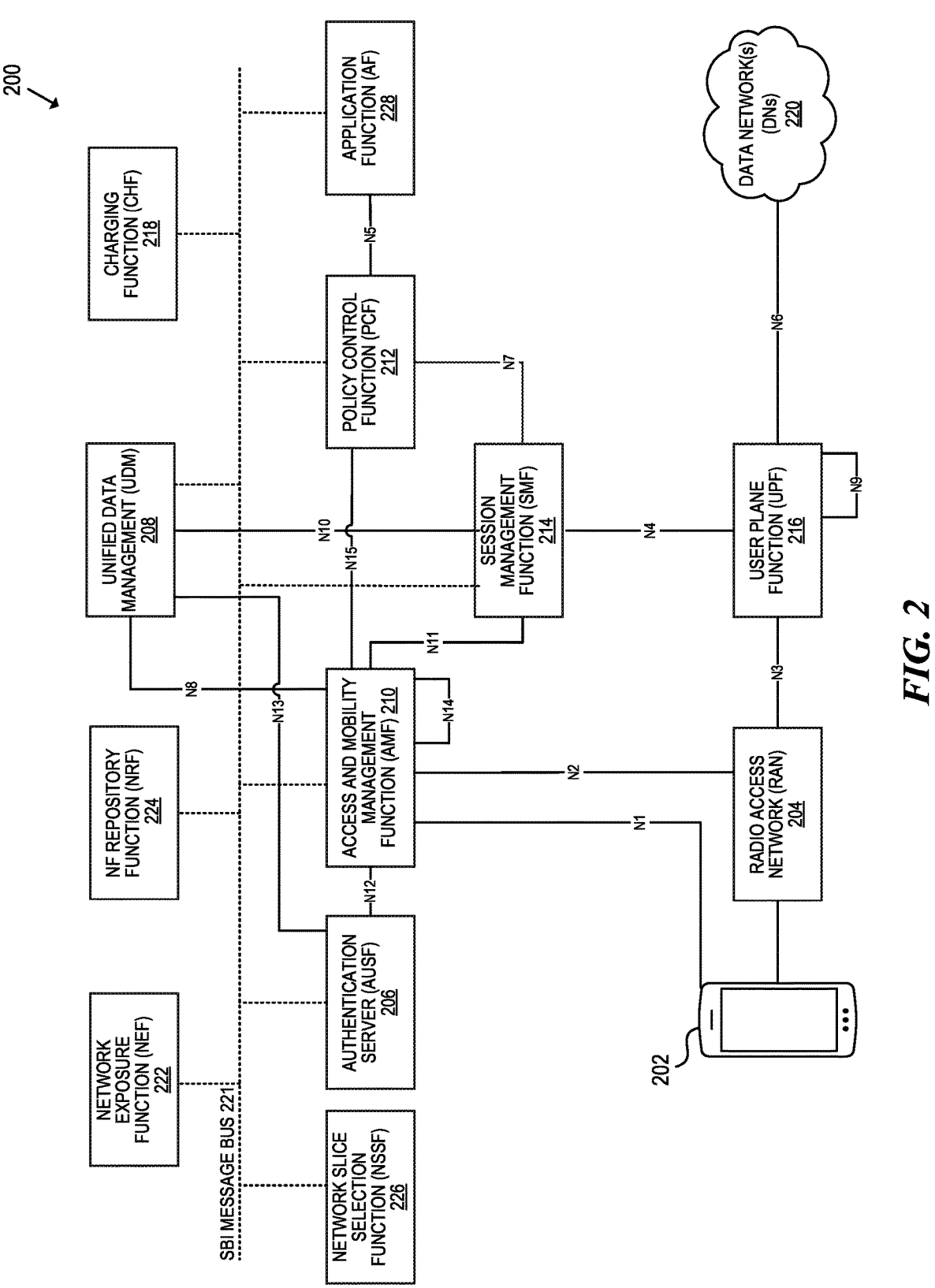
FIG. 2 is a block diagram that illustrates 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses Hypertext Transfer Protocol 2 (HTTP/2). The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given that a large number of wireless devices can connect to a 5G network, the UDM 208 can contain a voluminous amount of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a data center, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Providing Telecommunications Resources

Figure 3:
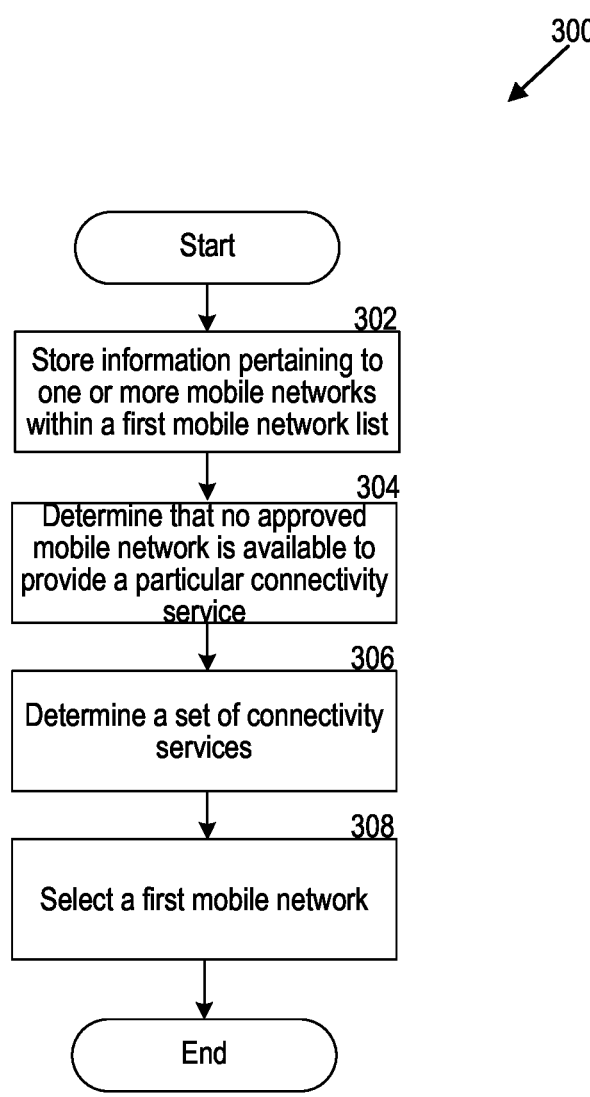
FIG. 3 is a flowchart illustrating a process for providing telecommunications resources to users based on telecommunications resource availability, in accordance with one or more implementations of the present technology.

FIG. 3 is a flowchart illustrating a process for providing telecommunications resources to users based on telecommunications resource availability, in accordance with one or more implementations of the present technology.

At 302, process 300 can store information pertaining to one or more mobile networks within a first mobile network list. For example, the system (e.g., process 300, implemented by one or more components of FIG. 1 or FIG. 2) can store information pertaining to one or more mobile networks within a first mobile network list, where a mobile device (e.g., wireless device 104 (FIG. 1)) is prevented from providing an access request to a mobile network indicated on the first mobile network list. The first mobile network list can be a mobile network graylist. For instance, the mobile network graylist may be a dynamic list that is configured to store PLMN codes of networks. A PLMN code can include an mobile country code (MCC) and an mobile network code (MNC) of a network (e.g., a terrestrial network, a satellite network, etc.). The graylist is updatable and enables PLMN codes to be added or removed from the list, such as to add a PLMN code of a given mobile network or to remove a PLMN code of a given mobile network. The graylist offers advantages over existing blacklists (e.g., a list indicating PLMN codes to which mobile networks are forbidden to connect) as networks indicated in the graylist (e.g., the PLMN codes of networks in the graylists) are networks that mobile devices are initially forbidden to access, however, upon certain criteria being met (e.g., no approved networks providing a particular connectivity service), enable the mobile device to establish a connection with such mobile networks.

The first mobile network list (e.g., the graylist) can be associated with a dedicated storage location at which information related to graylisted networks can be stored. In some implementations, at least a portion of the graylist can be implemented on a subscriber identify module (SIM) card of a mobile device (e.g., wireless device 104 (FIG. 1)). When information related to a network is listed in the graylist, the mobile device can be prevented from attempting to connect to the network. In some implementations, at least a portion of the graylist can be installed (e.g., as hardware, software, firmware, or any combination) onto the SIM card of the mobile device. In this way, the graylist can be implemented with limited alterations to the hardware, software, or firmware of the mobile device.

In some implementations, the graylist can store information indicative of one or more satellite networks (or other mobile networks). For instance, to reduce satellite network congestion (e.g., network traffic), the system can store information related to the satellite networks, which can include PLMN codes of satellite networks, in the graylist. By doing so, the mobile device may be prevented from generating a wireless access request to establish a connection with the satellite networks in the graylist, thereby (i) reducing the amount of wasted computational resources (e.g., processing and memory) required when generating an unnecessary wireless access request and (ii) reducing satellite network congestion by preventing a connection to be established.

At 304, process 300 can determine that no approved mobile network is available to provide a particular connectivity service. For example, the system can determine, via a second mobile network list, that no approved mobile network is available to provide a particular connectivity service. For instance, the second mobile network list can be a mobile network whitelist. The mobile network whitelist ("whitelist") may be a list that is configured to store PLMN codes of networks to which the mobile device is approved to connect (e.g., establish a connection with, transmit a wireless access request to, etc.).

The second mobile network list (e.g., the whitelist) can be associated with a dedicated storage location at which information related to whitelisted networks can be stored. In some implementations, at least a portion of the whitelist can be implemented on a SIM card of a mobile device (e.g., wireless device 104 (FIG. 1)). When information related to a network is listed in the whitelist, the mobile device can be enabled to connect to the network. In some implementations, at least a portion of the whitelist can be installed (e.g., as hardware, software, firmware, or any combination) onto the SIM card of the mobile device. In this way, the whitelist can be implemented with limited alterations to the hardware, software, or firmware of the mobile device.

To reduce the amount of satellite network congestion, the system leverages the whitelist to determine whether any mobile network that is part of the whitelist provides a particular connectivity service. For example, the particular connectivity service may be any wireless communication service, such as voice or video calling, text, data, emergency services, and so on. In some implementations, the particular connectivity service may be a user-indicated connectivity service (e.g., a connectivity service the user would like access to) or may be a default connectivity service (e.g., text services when all other communication services are unavailable). The system may first determine whether any mobile network (e.g., a terrestrial network) that is part of the whitelist provides the particular connectivity service prior to determining whether one or more mobile networks of the first mobile network list (e.g., the graylist) provide the particular connectivity service.

The system can determine whether any of the mobile networks indicated in the whitelist (or the graylist) provide the particular wireless communication service based on broadcast information broadcasted from these networks. Broadcast information can include PLMN codes of the network(s), connectivity service identifiers that indicate wireless communication services offered by the network(s), or other information. As an example, the mobile device may receive the broadcast information from one or more nearby networks and determine whether any of the nearby networks offer the particular connectivity service. For instance, a network may broadcast the broadcast information via one or more cell towers (e.g., base stations 102 (FIG. 1)) and a mobile device of the user may receive the broadcast information. The mobile device may determine whether the received broadcast information includes a PLMN code matching any of the PLMN codes in the whitelist.

If the received PLMN code matches a PLMN code in the whitelist, the mobile device can further determine, based on the received broadcast information, whether the particular connectivity service is offered by that network. If the particular connectivity service is offered by that network, the mobile device may transmit a wireless access request to establish a connection with that network. In this way, where the whitelist includes terrestrial networks, the system reduces satellite network congestion by establishing a connection with a terrestrial network that offers the particular service over a satellite network.

However, even if the PLMN code may match a PLMN code in the whitelist, the mobile device can further determine whether the network (corresponding to the PLMN code) offers the particular connectivity service. If the network does not offer the particular connectivity service, the mobile device can continue to scan for networks (e.g., via received broadcast information) that (i) are on the whitelist and (ii) offer the particular connectivity service for a predetermined amount of time (e.g., 20 seconds, 30 seconds, 1 minute, etc.). In some implementations, when the predetermined amount of time completes, the mobile device can determine that no approved mobile network is available that provides the particular connectivity service. In this way, the system reduces satellite network congestion by verifying that no approved networks are available that provide the particular connectivity service prior to attempting to connect to a satellite network, as will be discussed later.

At 306, process 300 can determine a set of connectivity services. For example, in response to the determination that no approved network is available to provide the particular connectivity service, the system can determine, for each mobile network of the one or more mobile networks of the first mobile network list (e.g., the graylist), a set of connectivity services associated with each respective mobile network of the one or more mobile networks. Upon determining that no approved networks (e.g., terrestrial networks) are available that offer the particular connectivity service, the system can determine what connectivity services are available via mobile networks that are part of the graylist (e.g., satellite networks).

For example, similar to the above, the mobile device may receive broadcast information from the satellite networks. As it has been determined that no approved mobile network of the whitelist offered the particular connectivity service, the mobile device may now consider the networks (e.g., the satellite networks) that are part of the graylist. The mobile device can determine, based on the broadcast information received from the satellite networks, what set of connectivity services each satellite network offers.

At 308, process 300 can select a first mobile network. For example, the system can select a first mobile network of the one or more mobile networks to provide a first access request to the first mobile network. The first access request may be provided to the first mobile network based on a corresponding set of connectivity services that include the particular connectivity service. For instance, as the user of the mobile device is in need of a particular connectivity service (e.g., voice or video calling, text, data, emergency services, etc.), the system may select a mobile network from the graylist (e.g., a satellite network) that offers the particular connectivity service as well as other connectivity services. In this way, the system reduces satellite network congestion by only providing access requests to satellite networks that offer the particular connectivity service.

The first access request can be a wireless access request to a mobile network that is configured to cause the establishment of a connection between a mobile device and the mobile network. For example, upon selecting the first mobile network, the mobile device can initiate a wireless access request to the first mobile network by performing at least a portion of a network selection/reselection procedure. Such network selection/reselection procedure can be any procedure that establishes a connection with a given network, such as registering with an available cell tower (e.g., base station 102 (FIG. 1)) of the network and authenticating the mobile device with the cell tower. For instance, such network selection/reselection procedure may involve (i) providing an international mobile subscriber identify (IMSI) to the first mobile network, (ii) receiving a challenge from the first mobile network, (iii) generating a response to the challenge (e.g., a key), (iv) providing the response to the first mobile network for authentication and verification, and (v) granting access to the first mobile network (e.g., when the response is authenticated and verified).

In some implementations, the system can provide the first wireless access request to the first mobile network to establish a connection with the first mobile network. For example, the system can generate the first wireless access request that includes (i) a mobile device identifier associated with the mobile device and (ii) an identifier associated with the particular communication service associated with the first mobile network. The mobile device identifier can be a serial number, a phone number, an international mobile equipment identify (IMEI) number, or other identifier that uniquely identifies the mobile device. The identifier associated with the particular communication service may be a communication service plan name, a communication service serial number, or other identifier that uniquely identifies a communication service that is provided by the first mobile network. The system can provide the generated first wireless access request to the first mobile network to establish a connection with the first mobile network. For example, the system may transmit the first wireless access request over one or more telecommunications networks (e.g., base stations, towers, etc.) that the mobile device is currently connected to establish a connection with the first mobile network (e.g., the network to which the mobile device is to be connected). In this way, the system may reduce the amount of network traffic by generating custom-tailored access requests based on a particular communication service provided by a given mobile network.

In some implementations, the system can receive a user selection of the first mobile network. For example, the system can generate, for display on a graphical user interface (GUI), a visual representation of the set of connectivity services associated with each respective mobile network of the one or more mobile networks. The system can then receive the selection, by a user of the first mobile device, indicating to provide the first wireless access request to the first mobile network. In one use case, the system may display a set of services offered by each mobile network of the one or more networks. For example, the set of services may include messaging services, data services, voice services, or other connectivity services. The user may select a service (or, alternatively, a mobile network itself) indicating the user's intent to connect to the mobile network providing the service of choice. In this way, the system improves existing user interfaces as available telecommunications resources (e.g., services, networks, etc.) are provided to the user in an all-in-one user interface.

In some implementations, the set of connectivity services can be associated with a first value. For example, each connectivity service of the set of connectivity services may include a value, such as a network speed of the connectivity service, a bandwidth of the connectivity service, a data rate of the connectivity service, a price of the connectivity service, or other value that is associated with each respective connectivity service. In this way, the system reduces user-choice overload by providing additional information pertaining to each connectivity service.

In some implementations, the system can select the first mobile network based on the set of corresponding connectivity services satisfying a threshold value. For example, each connectivity service of the set of corresponding connectivity services (e.g., the set of connectivity services that a telecommunications network provides) may be associated with a first value. As discussed above, the first value can be a network speed of the connectivity service, a bandwidth of the connectivity service, a data rate of the connectivity service, a price of the connectivity service, or other value that is associated with each respective connectivity service. The system can determine whether the corresponding set of connectivity services associated with the first mobile network includes the particular wireless communication service. For example, the user may be searching for a particular service but may be ignorant as to which telecommunications service providers may provide the service.

In response to determining that the corresponding set of connectivity services associated with the first mobile network includes the particular wireless communication service, the system can determine whether the first values of the set of corresponding connectivity services satisfy a threshold value. For example, the threshold value can be a threshold network speed of the connectivity service(s), a threshold bandwidth of the connectivity service(s), a threshold data rate of the connectivity service(s), a threshold price of the connectivity service(s), or other threshold value that is associated with each respective connectivity service(s). In some implementations, the first values of the set of corresponding connectivity services can satisfy the threshold value where the first values meet or exceed the threshold value, in accordance with some implementations of the present technology. In other implementations, the first values of the set of corresponding connectivity services can satisfy the threshold value where the first values fail to meet or exceed the threshold value, in accordance with some implementations of the present technology.

In response to the first values of the set of corresponding connectivity services satisfying the threshold value, the system selects the first mobile network of the one or more mobile networks to provide the first wireless access request to the first mobile network. In this way, the system reduces user-choice overload by automatically selecting a telecommunications network to connect to based on (i) available resources (e.g., services) and (ii) ensuring that the resource is adequate to connect to (e.g., an amount of bandwidth/network speed). Moreover, in this way, the system further reduces the amount of network traffic experienced over telecommunications resources by providing network access requests to only those networks that satisfy a given condition.

In some implementations, determining whether the first values of the set of corresponding connectivity services satisfy the threshold value may be based on whether a first value (e.g., an amount of bandwidth, signal strength, etc.) associated with the particular wireless communication service satisfied the threshold value. For example, as opposed to determining whether all values associated with the services offered by a given telecommunications service provider satisfy a given price threshold, the system can determine whether the price for a particular wireless communication service (e.g., data plan) satisfies a threshold price. In response to determining that the first value associated with the particular wireless communication service satisfies the threshold value, the system determines that the first values of the set of corresponding connectivity services satisfy the threshold value. In this way, the system may automatically select a telecommunications network service provider based on the particular service to which the user intends to connect to satisfy a threshold value, thereby improving the user experience.

In some implementations, each connectivity service may be associated with a first value that is associated with a usage metric. To provide telecommunications resources to users based on telecommunications resource availability, each connectivity service of the set of connectivity services can be associated with a first value that is associated with a usage metric of the respective connectivity service. For example, a given connectivity service, such as a data plan, may include a current network speed. As the network speed may increase or decrease based on the amount of use that the connectivity service of a telecommunications service provider provides, at a given point in time it may be advantageous to connect to the given connectivity service (e.g., where network speeds are high). As another example, where the use of the given connectivity service is high, a price of that given connectivity service may increase. For instance, where a number of users exceeds a threshold amount of users that are using a data service offered by a telecommunications service provider, then the price of the data service may increase relative to a base price of the data service. In this way, the system may determine the most effective connectivity service to connect to based on a predefined threshold value.

In some implementations, the system can update the second mobile network list. For example, where the second mobile network list represents a whitelist of approved telecommunications networks that the mobile device can connect to, the system may add the first mobile network (e.g., a satellite network) to the second mobile network list. The system can add the first mobile network list for a first time period (e.g., 30 minutes, 1 hour, 1 day, etc.) such that, when the first time period passes (e.g., ends), the first mobile network is removed from the second mobile network list, and the first mobile network is added back to the first mobile network list (e.g., a graylist). In this way, the system may reduce usage of satellite network resources by limiting connectivity to satellite networks for a time period.

Computing System

Figure 4:
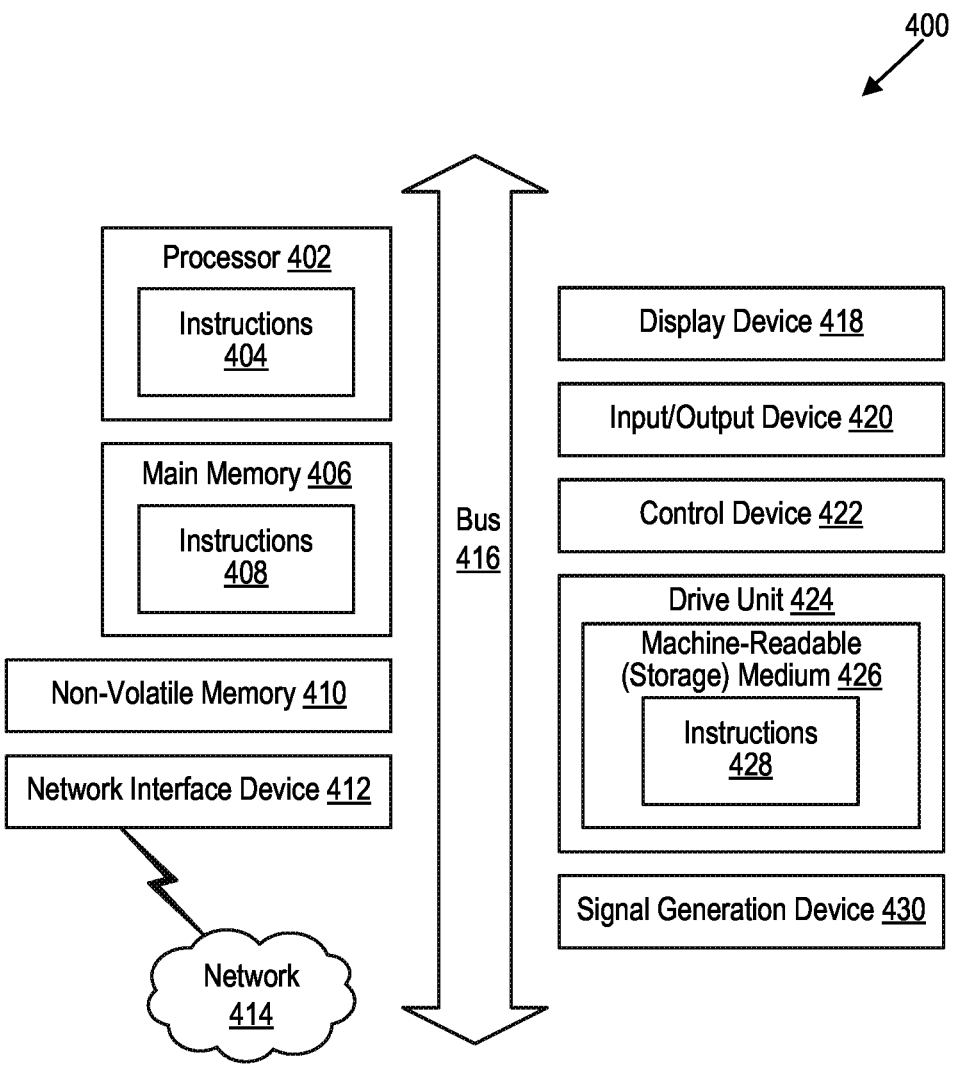
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include one or more processors 402, main memory 406, non-volatile memory 410, a network interface device 412, a display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specifies action(s) to be taken by the computing system 400. In some implementations, the computing system 400 can be an embedded computing system, a system-on-chip (SOC), a single-board computing (SBC) system, or a distributed system such as a mesh of computing systems, or it can include one or more cloud components in one or more networks. Where appropriate, one or more computing systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable (storage) medium 426) can be local, remote, or distributed. Although shown as a single medium, the machine-readable (storage) medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable (storage) medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for providing telecommunications resources to users based on telecommunications resource availability, the system comprising:
   at least one hardware processor; and
   at least one non-transitory memory storing instructions, which, when executed by the at least one hardware processor, cause the system to:
      store information indicative of one or more satellite networks within a mobile network graylist,
         wherein a mobile device is prevented from providing a wireless access request to a mobile network indicated on the mobile network graylist;
      determine, via a mobile network whitelist, that no approved terrestrial network is available to provide a particular wireless communication service;
      in response to the determination that no approved terrestrial network is available to provide the particular wireless communication service, determine, for each satellite network of the one or more satellite networks of the mobile network graylist, a set of connectivity services associated with each respective satellite network of the one or more satellite networks;

select a first satellite network of the one or more satellite networks to generate a first wireless access request to the first satellite network based on a corresponding set of connectivity services including the particular wireless communication service associated with the first satellite network, the first wireless access request comprising (i) a mobile device identifier associated with the mobile device and (ii) an identifier associated with the particular wireless communication service associated with the first satellite network; and establish a connection with the first satellite network by providing the generated first wireless access request to the first satellite network.

2. The system of claim 1, further comprising the instructions to:

generate, for display on a graphical user interface, a visual representation of the set of connectivity services associated with each respective satellite network of the one or more satellite networks; and receive the selection, by a user of the mobile device, indicating to provide the first wireless access request to the first satellite network.

3. The system of claim 1, wherein each connectivity service of the set of corresponding connectivity services associated with the first satellite network is associated with a first value, and wherein selecting the first satellite network further comprises causing the system to:

determine that the corresponding set of connectivity services associated with the first satellite network includes the particular wireless communication service;

in response to the determination that the corresponding set of connectivity services associated with the first satellite network includes the particular wireless communication service, determine whether the first values of the set of corresponding connectivity services satisfy a threshold value; and in response to the first values of the set of corresponding connectivity services satisfying the threshold value, select the first satellite network of the one or more satellite networks to provide the first wireless access request to the first satellite network.

4. The system of claim 3, wherein determining whether the first values of the set of corresponding connectivity services satisfy the threshold value further comprises causing the system to:

determine that a first value associated with the particular wireless communication service satisfies the threshold value; and in response to determining that the first value associated with the particular wireless communication service satisfies the threshold value, determine that the first values of the set of corresponding connectivity services satisfy the threshold value.

5. A method for providing telecommunications resources to users based on telecommunications resource availability, the method comprising:

storing information pertaining to one or more mobile networks within a first mobile network list, wherein a mobile device is prevented from providing an access request to a mobile network indicated on the first mobile network list;

determining, via a second mobile network list, that no approved mobile network is available to provide a particular connectivity service;

in response to the determination that no approved mobile network is available to provide the particular connectivity service, determining, for each mobile network of the one or more mobile networks of the first mobile network list, a set of connectivity services associated with each respective mobile network of the one or more mobile networks;

selecting a first mobile network of the one or more mobile networks to provide a first access request to the first mobile network based on a corresponding set of connectivity services including the particular connectivity service associated with the first mobile network, the first access request comprising (i) a mobile device identifier associated with the mobile device and (ii) an identifier associated with the particular connectivity service associated with the first mobile network; and providing the first access request to the first mobile network to establish a connection with the first mobile network.

6. The method of claim 5, further comprising:

generating, for display on a graphical user interface, a visual representation of the set of connectivity services associated with each respective mobile network of the one or more mobile networks; and receiving the selection, by a user of the mobile device, indicating to provide the first access request to the first mobile network.

7. The method of claim 6, wherein the visual representation of the set of connectivity services associated with each respective mobile network includes a first value associated with each connectivity service of the set of connectivity services.

8. The method of claim 5, wherein each connectivity service of the set of corresponding connectivity services associated with the first mobile network is associated with a first value, and wherein selecting the first mobile network further comprises:

determining that the corresponding set of connectivity services associated with the first mobile network includes the particular connectivity service;

in response to determining that the corresponding set of connectivity services associated with the first mobile network includes the particular connectivity service, determining whether the first values of the set of corresponding connectivity services satisfy a threshold value; and in response to the first values of the set of corresponding connectivity services satisfying the threshold value, selecting the first mobile network of the one or more mobile networks to provide the first access request to the first mobile network, wherein it is determined that the first values of the set of corresponding connectivity services satisfy the threshold value.

9. The method of claim 8, wherein determining whether the first values of the set of corresponding connectivity services satisfy the threshold value further comprises:

determining that a first value associated with the particular connectivity service satisfies the threshold value; and in response to determining that the first value associated with the particular connectivity service satisfies the threshold value, determining that the first values of the set of corresponding connectivity services satisfy the threshold value.

10. The method of claim 5, wherein each connectivity service of the set of connectivity services is associated with a first value that is associated with a usage metric of the respective connectivity service.

11. The method of claim 5, further comprising:

updating the second mobile network list by adding the first mobile network to the second mobile network list for a first time period such that when the first time period passes, (i) the first mobile network is removed from the second mobile network list and (ii) the first mobile network is added to the first mobile network list.

12. The method of claim 11, wherein the first mobile network is a satellite network.

13. One or more non-transitory, computer-readable media storing instructions, which, when executed by one or more processors, cause a system to:

store information pertaining to one or more mobile networks within a first mobile network list, wherein a mobile device is prevented from providing an access request to a mobile network indicated on the first mobile network list;

determine, via a second mobile network list, that no approved mobile network is available to provide a particular connectivity service;

in response to the determination that no approved mobile network is available to provide the particular connectivity service, determine, for each mobile network of the one or more mobile networks of the first mobile network list, a set of connectivity services associated with each respective mobile network of the one or more mobile networks;

select a first mobile network of the one or more mobile networks to provide a first access request to the first mobile network based on a corresponding set of connectivity services including the particular connectivity service associated with the first mobile network, the first access request comprising (i) a mobile device identifier associated with the mobile device and (ii) an identifier associated with the particular connectivity service associated with the first mobile network; and provide the first access request to the first mobile network to establish a connection with the first mobile network.

14. The media of claim 13, the instructions further causing the system to:

generate, for display on a graphical user interface, a visual representation of the set of connectivity services associated with each respective mobile network of the one or more mobile networks; and receive the selection, by a user of the mobile device, indicating to provide the first access request to the first mobile network.

15. The media of claim 14, wherein the visual representation of the set of connectivity services associated with each respective mobile network includes a first value associated with each connectivity service of the set of connectivity services.

16. The media of claim 13, wherein each connectivity service of the set of corresponding connectivity services associated with the first mobile network is associated with a first value, and wherein selecting the first mobile network further comprises causing the system to:

determine that the corresponding set of connectivity services associated with the first mobile network includes the particular connectivity service;

in response to determining that the corresponding set of connectivity services associated with the first mobile network includes the particular connectivity service, determine whether the first values of the set of corresponding connectivity services satisfy a threshold value; and in response to the first values of the set of corresponding connectivity services satisfying the threshold value, select the first mobile network of the one or more mobile networks to provide the first access request to the first mobile network.

17. The media of claim 16, wherein determining whether the first values of the set of corresponding connectivity services satisfy the threshold value further comprises causing the system to:

determine that a first value associated with the particular connectivity service satisfies the threshold value; and in response to determining that the first value associated with the particular connectivity service satisfies the threshold value, determine that the first values of the set of corresponding connectivity services satisfy the threshold value.

18. The media of claim 13, wherein each connectivity service of the set of connectivity services is associated with a first value that is associated with a usage metric of the respective connectivity service.

* * * * *